United States Patent
Nakagawa

(10) Patent No.: US 8,317,408 B2
(45) Date of Patent: Nov. 27, 2012

(54) OPTICAL-FIBER CONNECTION UNIT, AND OPTICAL CONNECTOR AND OPTICAL ADAPTER USED THEREIN

(75) Inventor: Masaya Nakagawa, Kyoto (JP)

(73) Assignee: Suncall Corporation, Kyoto (JP)

( * ) Notice: Subject to any disclaimer, the term of this patent is extended or adjusted under 35 U.S.C. 154(b) by 243 days.

(21) Appl. No.: 12/880,267

(22) Filed: Sep. 13, 2010

(65) Prior Publication Data

US 2011/0081116 A1 Apr. 7, 2011

(30) Foreign Application Priority Data

Oct. 5, 2009 (JP) ................................. 2009-231381

(51) Int. Cl.
    *G02B 6/36* (2006.01)
(52) U.S. Cl. ................. 385/78; 385/53; 385/76; 385/77
(58) Field of Classification Search ............ 385/53, 385/52, 56, 58, 59, 62, 66, 68, 72, 73, 77, 385/78, 81, 84, 92
See application file for complete search history.

(56) References Cited

U.S. PATENT DOCUMENTS

| | | | | |
|---|---|---|---|---|
| 4,934,785 A * | 6/1990 | Mathis et al. | ................... | 385/68 |
| 5,297,227 A * | 3/1994 | Brown et al. | ................... | 385/56 |
| 5,751,874 A * | 5/1998 | Chudoba et al. | ................ | 385/72 |
| 5,774,611 A | 6/1998 | Nagase et al. | | |
| 5,887,095 A | 3/1999 | Nagase et al. | | |
| 6,599,024 B2 * | 7/2003 | Zimmel | ........................ | 385/73 |
| 7,665,901 B2 * | 2/2010 | Kewitsch | ........................ | 385/73 |
| 2008/0019642 A1 * | 1/2008 | Kewitsch | ........................ | 385/72 |
| 2011/0081116 A1 * | 4/2011 | Nakagawa | ..................... | 385/78 |

FOREIGN PATENT DOCUMENTS

| | | |
|---|---|---|
| EP | 0 731 369 | 9/1996 |
| EP | 1 486 808 | 12/2004 |
| JP | 8-248263 | 9/1996 |
| JP | 2009-086168 | 4/2009 |

OTHER PUBLICATIONS

Japanese Office Action issued Jul. 13, 2011 in corresponding Japanese Patent Application No. 2009-231381 w/English translation.

* cited by examiner

*Primary Examiner* — Brian Healy
(74) *Attorney, Agent, or Firm* — Wenderoth, Lind & Ponack, L.L.P.

(57) ABSTRACT

Provided is an optical-fiber connection unit in which a split sleeve (14) for performing centering of distal end portions of ferrules (11 and 111) is provided not to an optical adapter (20) but to an optical connector (10). With this configuration, it is unnecessary to provide a sleeve holder inside a casing (21) of the optical adapter (20), and hence a shape of the optical adapter (20) is simplified. Further, a sleeve holder (13) provided to the optical connector (10) is formed in a state of being exposed outward. Thus, a risk of defective molding is reduced, and presence or absence of defective molding can be easily confirmed.

5 Claims, 4 Drawing Sheets

OPTICAL-FIBER CONNECTION UNIT, AND OPTICAL CONNECTOR AND OPTICAL ADAPTER USED THEREIN

TECHNICAL FIELD

The present invention relates to an optical-fiber connection unit, and an optical connector and optical adapter used therein.

BACKGROUND ART

For example, FIG. 5 of Patent Literature 1 illustrates an optical adapter for connecting a pair of optical connectors. The optical adapter has on both sides thereof a pair of attachment holes into which the optical connectors are attached. On inner peripheries of the attachment holes, there are provided a split sleeve and a sleeve holder for holding the split sleeve from an outer periphery thereof. Respective distal end portions of ferrules of the optical connectors are inserted from both sides along an inner periphery of the split sleeve, and the distal end portions of the ferrules are brought into contact with each other inside the inner periphery thereof.

FIG. 8 illustrates an optical-fiber connection unit 100 including an optical connector 110 and an optical adapter 120 having a similar structure to that disclosed in Patent Literature 1. The optical connector 110 includes a ferrule 111 having an inner periphery inside which an optical fiber (not shown) is allowed to pass, and a housing 112 for retaining the ferrule 111 from an outer periphery thereof. The optical adapter 120 includes the following: a casing 121 having attachment holes 121a1 and 121b1 for the optical connector 110, the attachment holes being opened on both sides, in an axial direction; a split sleeve 122 having an inner periphery along which a distal end portion of the ferrule 111 is inserted; and a sleeve holder 123 for retaining the split sleeve 122 from an outer periphery thereof. The casing 121 is constituted by two members 121a and 121b formed by being divided substantially at an axial central portion and bonded to each other. Note that, the axial direction represents a direction in which the optical fiber is passed in a state in which the optical connector 110 and the optical adapter 120 are unitized (hereinafter, the same applies), and hence a lateral direction in FIG. 8 is the axial direction.

The split sleeve 122 is provided for performing centering of the pair of ferrules inserted from both the sides in the axial direction. In the state illustrated in FIG. 8, the distal end portion of the ferrule 111 of the optical connector 110 is inserted from one side in the axial direction (right side in FIG. 8). In this state, a distal end portion of a ferrule of another optical connector (not shown) is inserted from another side in the axial direction (left side in FIG. 8) of the split sleeve 122. Then, distal end portions of both the ferrules are hit against each other in a state of being subjected to centering on the inner periphery of the split sleeve 122.

CITATION LIST

Patent Literature

[PTL1]: JP 2009-86168 A

SUMMARY OF INVENTION

Technical Problems

In the optical-fiber connection unit 100 as described above, the distal end portions of the pair of ferrules are hit against each other inside the casing 121 of the optical adapter 120. Thus, the split sleeve 122 and the sleeve holder 123 are arranged in inner portions of the attachment holes 121a1 and 121b1 of the casing 121 (at the central portion therebetween in the axial direction).

Molding accuracy of the sleeve holder 123 has a significant influence on optical properties such as insertion loss, and hence it is necessary to mold the sleeve holder 123 with high accuracy. However, it is difficult to mold the sleeve holder 123 provided in the inner portions of the attachment holes of the casing 121 as described above, and hence defective molding is liable to occur. For example, when the optical adapter 120 is made by injection molding of a resin, at the time of cooling and curing of a molten resin injected into a mold, the sleeve holder 123 surrounded by the casing 121 is less liable to cool. Thus, when the mold is opened in a state in which the sleeve holder 123 is not sufficiently cured, there is a risk that the sleeve holder 123 is pulled by the mold to be extended in the axial direction, or torn at worst. In particular, a multi-core optical adapter in which a plurality of optical adapters are molded integrally with each other has a large size after being completed as a product, and hence it is difficult to mold precision parts. In addition, when defective molding is found in even only one part, a multi-core optical adapter has to be disposed of as a whole, and thus the yield thereof is significantly reduced.

Further, after the molding of the optical adapter 120, it is necessary to confirm the presence or absence of defective molding of the sleeve holder 123. However, the sleeve holder 123 is surrounded by the casing 121, and hence it is difficult to confirm the presence or absence of the defective molding.

Still further, in the optical adapter 120 illustrated in FIG. 8, locking portions 123a projected radially inward are provided at both axial end portions of the sleeve holder 123, and axial movement of the split sleeve 122 is regulated by the locking portions 123a. The locking portions 123a formed at both axial end portions of the sleeve holder 123 constitute undercuts, and hence the casing 121 including the sleeve holder 123 and the locking portions 123a cannot be integrally molded as a whole. Accordingly, when the optical adapter 120 is manufactured, it is necessary to prevent formation of undercuts at the time of molding the members 121a and 121b. For this purpose, as illustrated in FIG. 8, for example, the two members 121a and 121b of the optical adapter 120 are separately molded, and the locking portions 123a formed at both the axial end portions of the sleeve holder 123 are formed on the separate members. The optical adapter 120 is completed in the following manner: after each of the members 121a and 121b is molded, the sleeve holder 123 constituted by the members 121a and 121b is externally inserted from both ends of the split sleeve 122, and contact portions of the members 121a and 121b are bonded to each other by welding or the like. As just described above, it is inevitable that the optical adapter 120 is separately molded. Thus, the following steps have been required: separately molding the plurality of members 121a and 121b, and bonding those members to each other, which has led to an increase in man-hour.

Further, foreign matters such as dust adhering to the distal end portion of the ferrule 111 and an inner peripheral surface of the split sleeve 122 may deteriorate a contact state of the ferrule. As a countermeasure, when the optical connector 110 and the optical adapter 120 are transported, there are provided dust caps (not shown) for protecting the ferrule 111 and the split sleeve 122. In the optical-fiber connection unit 100 illustrated in FIG. 8, it is necessary to provide a dust cap for protecting the ferrule 111 of the optical connector 110 and a dust cap for protecting the split sleeve 122 of the optical adapter 120. Thus, it is necessary to manufacture dust caps of various types in proportion to the number of components, which has led to a cost increase.

Under the circumstances, the present invention has been made to provide an optical-fiber connection unit having the following advantages: preventing defective molding of the sleeve holder; enabling the presence or absence of the defective formation to be easily confirmed in case of the defective molding of, for example, the sleeve holder; and being capable of being manufactured at low cost.

Solution to Problems

In order to solve the above-mentioned problems, an optical-fiber connection unit according to the present invention includes: an optical connector including: a ferrule having an inner periphery inside which an optical fiber is allowed to pass; a housing for retaining the ferrule inside an inner periphery thereof; a split sleeve having an inner periphery along which a distal end portion of the ferrule is inserted; and a sleeve holder provided at a distal end portion of the housing and having an inner periphery inside which the split sleeve is retained; and an optical adapter including: a casing provided with a pair of attachment holes; and a fitting hole provided inside the casing so that the pair of attachment holes are communicated with each other and that an outer peripheral surface of the sleeve holder provided to the optical connector is fitted to an inner peripheral surface of the fitting hole. Note that, in the axial direction of the optical connector, the distal end side of the ferrule is referred to simply as "distal end side," and the side opposite thereto as "proximal end side."

As described just above, according to the present invention, the split sleeve and the sleeve holder are provided not to the optical adapter but to the optical connector. With this configuration, it is unnecessary to provide the sleeve holder inside the casing of the optical adapter. Accordingly, a double-pipe structure constituted by the casing and the sleeve holder is omitted, and thus the shape of the optical adapter is simplified. Meanwhile, when the split sleeve and the sleeve holder are provided to the optical connector, the sleeve holder can be provided at a distal end portion of the housing in a state of being exposed outward. Thus, the sleeve holder is more easily molded in comparison with the conventional sleeve holder (refer to FIG. 8) provided inside the casing, and hence defective molding is less liable to occur. Further, because the sleeve holder is exposed outward, the presence or absence of defective molding of the sleeve holder can be easily confirmed from the outside.

Further, because both the split sleeve and the ferrule are provided to the optical connector, it is only necessary that a dust cap for preventing foreign matters from adhering to those members be provided only on the optical connector side. Accordingly, it is possible to omit the dust cap to be attached to the optical adapter. Further, it is only necessary that only one type of dust cap for the optical connector be provided, and hence a manufacturing cost of the dust cap is significantly reduced.

When a locking portion projected radially inward is provided at a distal end portion of the sleeve holder provided in the optical connector, and when the locking portion and a distal end portion of the split sleeve are engaged with each other in the axial direction, axial movement of the split sleeve to the distal end side can be regulated by the locking portions. Meanwhile, it is unnecessary that the optical adapter be provided with the split sleeve and the sleeve holder. As a result, the locking portion which causes an undercut is eliminated from the sleeve holder, and hence the casing can be integrally molded as a whole.

In the optical-fiber connection unit as described above, it is necessary to attach the following impairs into a pair of attachment holes provided to the optical adapter: the optical connector with the split sleeve and the sleeve holder (hereinafter, also referred to as sleeved optical connector) and a normal optical connector without the split sleeve or the sleeve holder (refer to FIG. 8). When the sleeved optical connector is attached into each of the pair of attachment holes of the optical adapter, optical fibers are not connected because the sleeve holders thereof interfere with each other. Further, when the normal optical connector is attached into each of the pair of attachment holes of the optical adapter, the distal end portions of the ferrules cannot be accurately hit against each other because the split sleeve for performing centering of the ferrule is not provided. Thus, when the optical connectors are attached into the attachment holes of the optical adapter, it is necessary to confirm whether or not the precedingly-attached optical connector is sleeved one.

Further, when the sleeved optical connector and the normal optical connector are attached in pairs to the optical adapter, attachment procedures are important. Specifically, by preceding attachment of the sleeved optical connector into the attachment hole on one side of the optical adapter, an outer peripheral surface of the sleeve holder is fitted into a fitting hole, and thus positioning is effected. As a result, the attachment hole on another side of the optical adapter can be configured similarly to the conventional optical adapter (refer to FIG. 8) inside which the split sleeve and the sleeve holder are arranged. Thus, the normal optical connector can be easily attached as is conventionally done. In contrast, when the normal optical connector is precedingly attached into the attachment hole on the one side of the optical adapter, a state is reached in which the distal end portion of the ferrule of the normal optical connector is arranged inside the attachment hole on the another side. When an attempt is made to attach the sleeved optical connector into the attachment hole in such a state, it is necessary to fit the outer peripheral surface of the sleeve holder to an inner peripheral surface of the fitting hole of the optical adapter simultaneously with insertion of the ferrule of the normal optical connector along the inner periphery of the split sleeve, which leads to difficulty of attachment.

In this context, when the sleeved optical connector is used as a so-called behind-the-wall (BTW) optical connector arranged inside an electronic apparatus or a house wall surface, the optical connector can be easily attached while a risk of erroneous attachment is reliably avoided. Specifically, in the optical adapter used, for example, as an optical connection terminal of an electronic apparatus, the attachment hole on the one side is opened to the inner side of the box body of the electronic apparatus, and the attachment hole on the another side is opened to the outer side of the box body thereof. Thus, the optical connector attached into the attachment hole on the inner side of the box body is hardly attached/detached after being attached at the time of assembly of the electronic apparatus. In contrast, the optical connector is frequently attached/detached as a connection terminal with respect to the attachment hole on the outer side of the box body. Accordingly, when the sleeved optical connector is attached in advance into the attachment hole on the inner side of the box body (that is, used as a BTW optical connector), it is clearly recognized that the normal optical connector is connected into the outer-side attachment hole with respect to which the attachment/detachment is frequently performed, and hence erroneous attachment of the optical connectors can be avoided. Further, the sleeved optical connector has already been attached to the optical adapter at the time of completion of assembly of the electronic apparatus, and hence the normal optical connector is reliably prevented from being precedingly attached.

Advantageous Effects of Invention

As described above, the optical-fiber connection unit of the present invention has the following advantages: preventing defective molding of the sleeve holder; enabling the presence or absence of occurrence of the defective molding of the sleeve holder to be easily confirmed; contributing to reduction of a manufacturing cost.

DESCRIPTION OF EMBODIMENTS

In the following, embodiments of the present invention are described with reference to the drawings.

Figure 1:
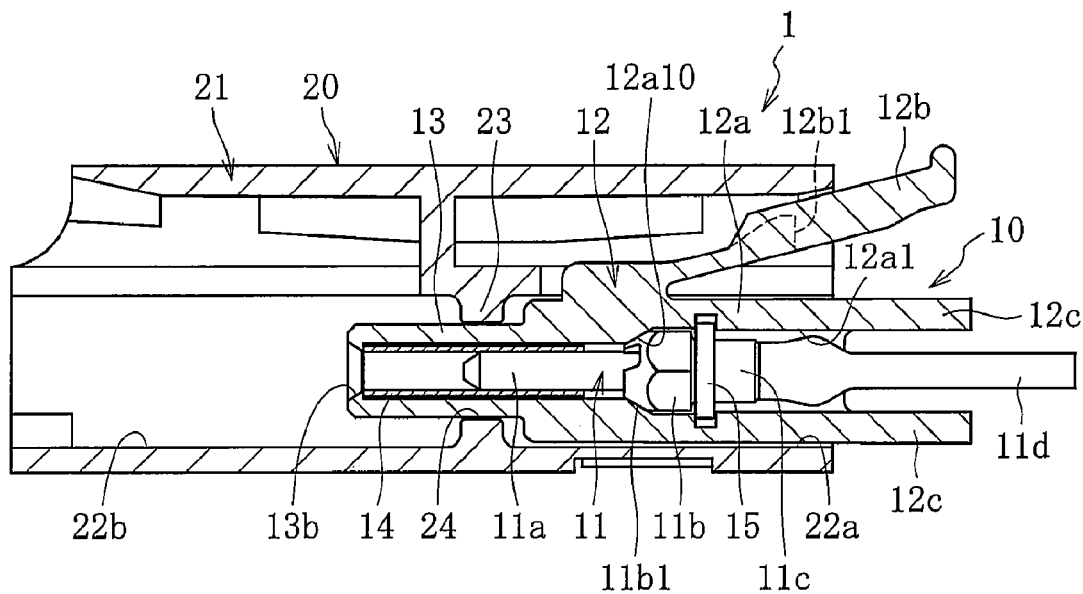
FIG. 1 A sectional view of an optical-fiber connection unit.

FIG. 1 illustrates an optical-fiber connection unit 1 according to an embodiment of the present invention. The optical-fiber connection unit 1 includes an optical connector 10 and an optical adapter 20. The optical-fiber connection unit 1 is used as an optical connection terminal provided to an electronic apparatus or a house wall surface, for example, as an optical connection terminal of a server. Note that, FIG. 1 illustrates a state in which the optical connector 10 according to the embodiment of the present invention is attached into one of attachment holes 22a on one side of pairs of attachment holes 22a and attachment holes 22b provided to the optical adapter 20, and normal optical connector (not shown) (refer to FIG. 8) is attached into one of the attachment holes 22b on the another side of the optical adapter 20. In the state illustrated in FIG. 1, the optical-fiber connection unit 1 is attached to a wall surface so that the optical connector 10 is arranged inside an electronic apparatus or a house wall surface (used as a behind-the-wall (BTW) optical connector).

The optical connector 10 includes the following: a ferrule 11 having an inner periphery inside which an optical fiber (not shown) is allowed to pass; a housing 12 for retaining the ferrule 11 inside an inner periphery thereof; a sleeve holder 13 projected from the housing 12 to a distal end side; a split sleeve 14 retained inside an inner periphery of the sleeve holder 13 and having an inner periphery along which a distal end portion of the ferrule 11 is inserted; and a stopper 15 for regulating movement of the ferrule 11 to a proximal end side.

The ferrule 11 includes a capillary 11a, a flange portion 11b, a cylindrical portion 11c, and a protective tube 11d. The capillary 11a is made of a material such as ceramic (zirconia, for example) or glass, and has axial pores (not shown) which are formed in an inner periphery thereof and through which the optical fiber is allowed to pass. The flange portion 11b and the cylindrical portion 11c are made integrally with each other of a metal material such as brass, and the capillary 11a is fixed to a distal end portion of the flange portion 11b by being press-fitted thereto. A tapered surface 11b1 is provided on the distal end portion of the flange portion 11b, and the protective tube 11d for protecting the optical fiber extending from the ferrule 11 to the proximal end side is attached to a proximal end portion of the cylindrical portion 11c.

Figure 2:
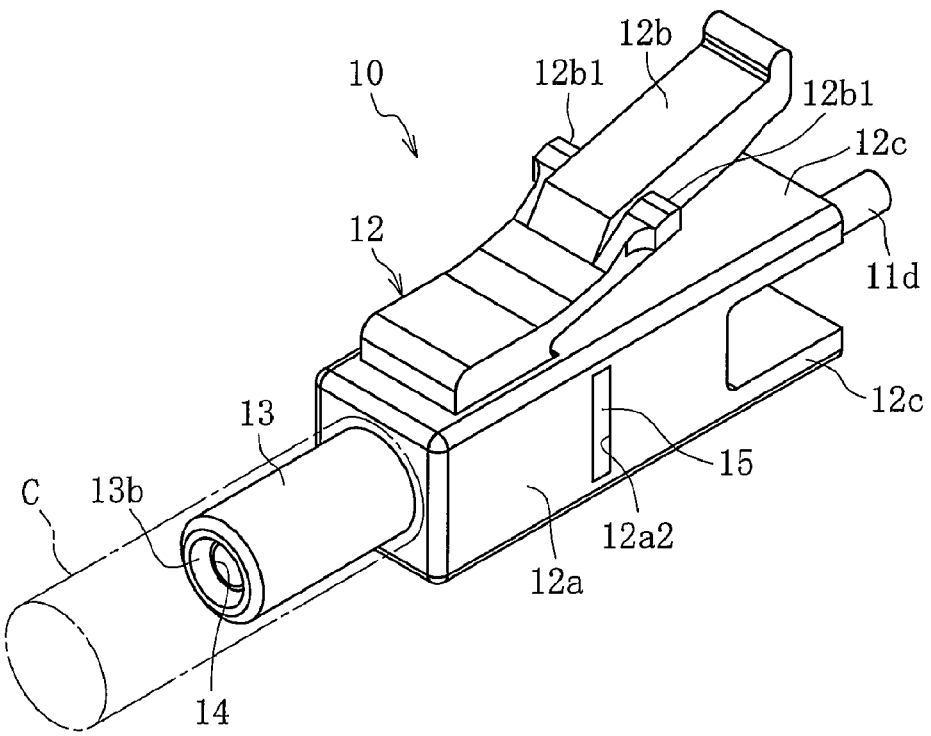
FIG. 2 A perspective view of an optical connector.

The housing 12 is integrally made, for example, by die-molding of a resin (injection molding), and as illustrated in FIG. 2, includes a main body portion 12a having substantially a rectangular-parallelepiped shape, a latch 12b provided on one side-surface (upper surface) of the main body portion 12a, and a cover portion 12c extending from the main body portion 12a to the proximal end side.

As illustrated in FIG. 1, the main body portion 12a is provided with an axial through-hole 12a1, and the ferrule 11 is retained inside an inner periphery of the through-hole 12a1. The through-hole 12a1 is provided with a tapered surface 12a10 reduced in diameter to the distal end side, the tapered surface 12a10 being held in contact with the tapered surface 11b1 of the flange portion 11b of the ferrule 11. The latch 12b obliquely extends upward from a distal-end-side portion on the upper surface of the main body portion 12a to the proximal end side, and a locking surface 12b1 facing the proximal end side is provided to an intermediate portion between the latch 12b and the distal-end-side portion on the upper surface of the main body portion 12a. The cover portion 12c is provided on the proximal end side of the main body portion 12a, and covers an outer periphery of the protective tube 11d projected from the main body portion 12a to the proximal end side. In the illustrations, the cover portion 12c is constituted by a pair of long plate-shaped members provided above and below the protective tube 11d.

The sleeve holder 13 is projected from a distal end portion of the main body portion 12a of the housing 12 to the distal end side, and retains the split sleeve 14 inside the inner periphery thereof over the entire axial length. In this embodiment, the sleeve holder 13 has a cylindrical shape, and is molded of a resin integrally with the housing 12 (refer to FIG. 2). An inner peripheral surface 13a of the sleeve holder 13 and an outer peripheral surface of the split sleeve 14 are loosely fitted to each other. A locking portion 13b projected radially inward is provided at a distal end portion of the sleeve holder 13. A distal end portion of the split sleeve 14 is engaged with the locking portion 13b in the axial direction, and thus movement of the split sleeve 14 to the distal end side is regulated (refer to FIG. 1).

Figure 3:
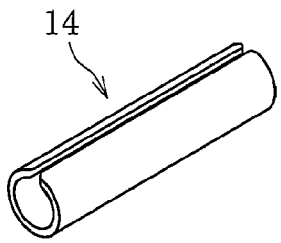
FIG. 3 A perspective view of a split sleeve.

As illustrated in FIG. 3, the split sleeve 14 has a cut-out cylindrical shape in which a part in a circumferential direction is cut out in the axial direction. The split sleeve 14 is made of, for example, ceramic such as alumina or metal such as phosphor bronze. An inner diameter dimension of the split sleeve 14 in a state in which the capillary 11a of the ferrule 11 is not inserted along an inner periphery of the split sleeve 14 is set to be slightly smaller than an outer diameter dimension of the capillary 11a. The capillary 11a is inserted along the inner periphery of the split sleeve 14 in a state of being fixed by pressure, and a distal end portion of the capillary 11a is arranged at an axial midway point (substantially central position in the axial direction) of the split sleeve 14 (refer to FIG. 1).

Figure 4:
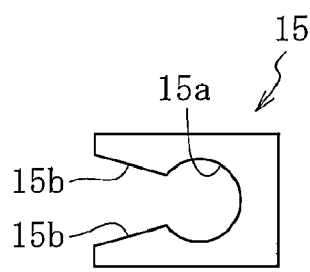
FIG. 4 A front view of a stopper.

The stopper 15 is provided in a stopper-attachment hole 12a2 provided in a side surface of the housing 12 (refer to FIG. 2), and is engaged with the flange portion 11b of the ferrule 11 in the axial direction. In this manner, the stopper 15 regulates the movement of the ferrule 11 to the proximal end side. As illustrated in FIG. 4, the stopper 15 in this embodiment is formed in a substantially reverse C-shape in front view. A circular-arc portion 15a fitted to an outer peripheral surface of the cylindrical portion 11c of the ferrule 11 is formed substantially at a central portion of the stopper 15. A pair of guide surfaces 15b and 15b between which a gap is gradually widened outward in the width direction is formed on one side in the width direction of the circular-arc portion 15a.

Figure 5:
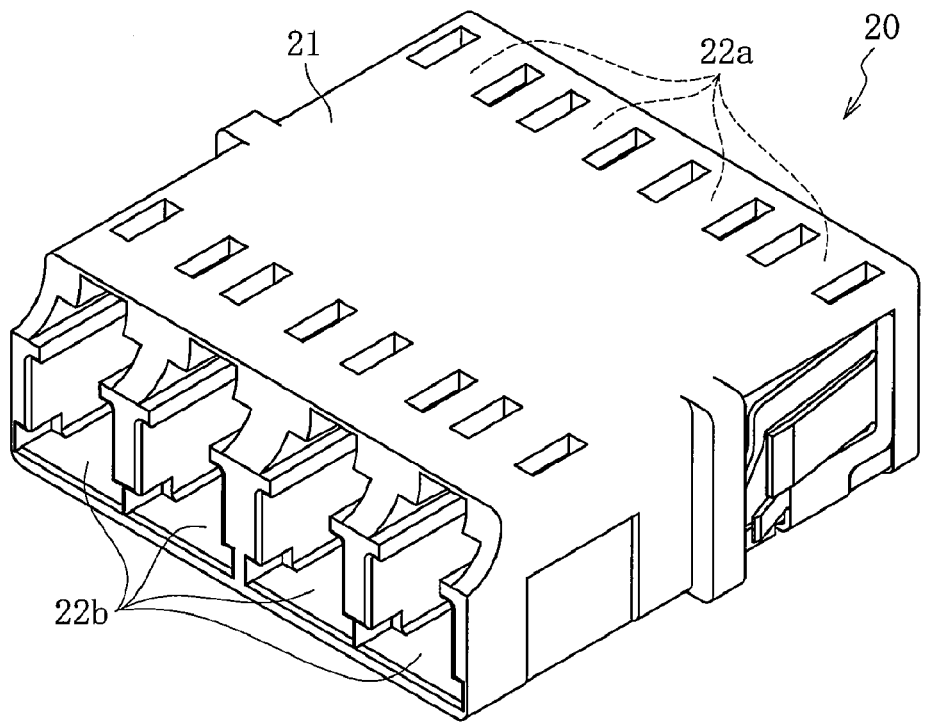
FIG. 5 A perspective view of an optical adapter.

The optical adapter 20 includes a casing 21, and the pairs of attachment holes 22a and 22b are provided in the casing 21 (refer to FIG. 1). The optical connector 10 is attached into one of the attachment holes 22a on the one side, and a normal optical adapter (not shown) is attached into one of the attachment holes 22b on another side. As illustrated in FIG. 5, the optical adapter 20 in this embodiment is of a multi-core type in which the casing 21 integrally molded of a resin and having substantially a rectangular-parallelepiped shape is provided with the plurality of pairs (four pairs in illustration) of attachment holes 22a and 22b. Note that, the optical adapter is not limited to the four-core type as illustrated in FIG. 5, and another multiple-core type such as a two-core, an eight-core, a twelve-core, or a twenty-four core type, or a single-core type may be adopted.

As illustrated in FIG. 1, an inner wall 23 in a direction orthogonal to the axial direction is formed at substantially a central position in the axial direction of the inner hole of the casing 21. The inner wall 23 is provided with a fitting hole 24 for communicating the pairs of attachment holes 22a and 22b with each other in the axial direction. In a state in which the optical connector 10 is attached to the optical adapter 20, an outer peripheral surface of the sleeve holder 13 of the optical connector 10 is fitted to an inner peripheral surface of the fitting hole 24, and an outer peripheral surface of the housing 12 is fitted to an inner peripheral surface of each of the attachment holes 22a. Further, the locking surface 12b1 of the latch 12b of the optical connector 10 is engaged in the axial direction with a locking portion (not shown) provided to the optical adapter 20, and thus disconnection of the optical connector 10 from the optical adapter 20 is regulated. The latch 12b of the optical connector 10 is pressed down while being elastically deformed so that the locking surface 12b1 and the locking portion of the optical adapter 20 are disengaged from each other. In this manner, the optical connector 10 is detachable with respect to the optical adapter 20.

As described above, in the optical-fiber connection unit 1 of the present invention, the sleeve holder 13 and the split sleeve 14 are provided to the optical connector 10, and thus the shape of the optical adapter 20 is simplified. Specifically, it is unnecessary to arrange the sleeve holder 13 in the inner holes of the optical adapter 20 (attachment holes 22a and 22b and fitting hole 24), and hence a double-pipe structure is not constituted in the optical adapter 20 by the casing 21 and the sleeve holder 13, with the result that a risk of defective molding is reduced. Further, unlike the conventional optical adapter 120 illustrated in FIG. 8, the optical adapter 20 is not provided with the locking portions 123a at both axial end portions of the sleeve holder 123, and undercuts thereof are not formed. Thus, the casing 21 can be integrally molded of a resin so as to achieve cost reduction.

Figure 8:
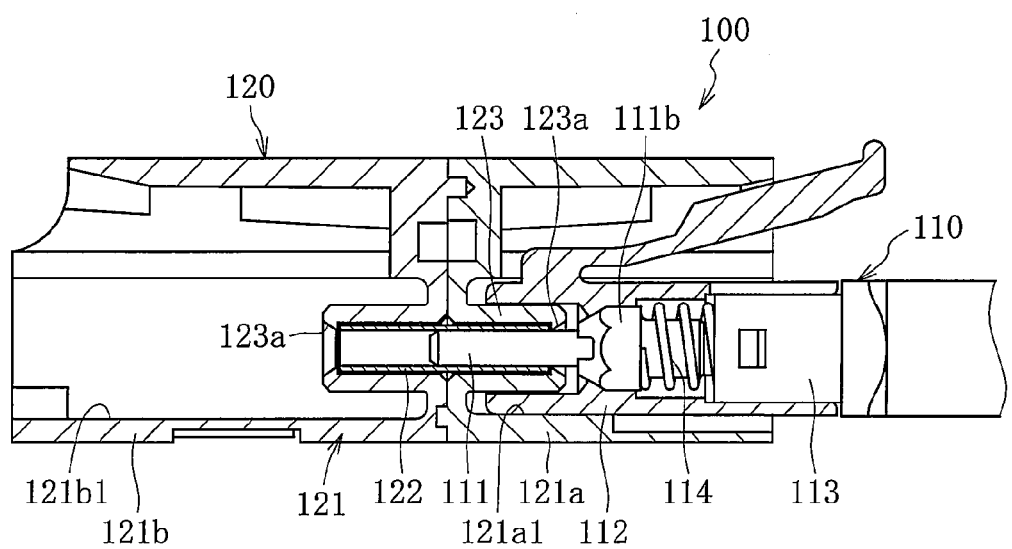
FIG. 8 A sectional view of a conventional optical-fiber connection unit (normal optical connector).

The normal optical connector 110 illustrated FIG. 8 is attached into one of the attachment holes 22b on the another side of the optical adapter 20 of the optical-fiber connection unit 1 as described above, and thus the distal end portions of the ferrules 11 and 111 of both the optical connectors 10 and 110 come into contact with each other. Specifically, the housing 112 of the normal optical connector 110 is fitted to one of the attachment holes 22b on the another side of the optical adapter 20, and the distal end portion of the ferrule 111 is inserted along the inner periphery of the sleeve holder 13 of the optical connector 10 of the present invention. With this configuration, the distal end portions of both the optical connectors 10 and 110 are hit against each other substantially at an axial central portion of the inner periphery of the split sleeve 14, and thus the optical fibers inside the inner periphery of each of the ferrules 11 and 111 are connected with each other.

In this case, the ferrule 11 of the precedingly-attached optical connector 10 of the present invention is pressed-in with the ferrule 111 of the normal optical connector 110 to be attached later and should be retracted to the proximal end side (right side in FIG. 1). However, a proximal end portion of the flange portion 11b of the ferrule 11 is locked by the stopper 15, and thus retraction of the ferrule 11 is regulated. Further, an outer periphery of the split sleeve 14 is loosely fitted to the inner periphery of the sleeve holder 13, and the split sleeve 14 is retained in an axially movable state. Thus, when the ferrule 111 of the normal optical connector 110 is press-fitted to the split sleeve 14, the split sleeve 14 should be retracted to the proximal end side with respect to the sleeve holder 13. In this case, when the split sleeve 14 is still retracted even though retraction of the split sleeve 14 to the proximal end side is suppressed by fixing the ferrule 11 of the optical connector 10 of the present invention and the split sleeve 14 by pressure to each other, the split sleeve 14 comes into contact with the distal end portion of the flange portion 11b, to thereby regulate the retraction.

Further, in the normal optical connector 110 illustrated in FIG. 8, a spring 114 is interposed between a housing cap 113 provided at a proximal end portion of the housing 112 and a flange portion 111b of the ferrule 111, and the spring 114 allows axial movement of the ferrule 111. Thus, in a state in which both the optical connectors 10 and 110 are attached to the optical adapter 20, errors in axial positions of both the optical connectors 10 and 110 can be absorbed by compression of the spring 114, and thus the distal end portions of the ferrules 11 and 111 can be reliably brought into contact with each other by appropriate pressure.

When the optical connector 10 is transported, a dust cap C (indicated by chain lines in FIG. 2) is attached to the sleeve holder 13. Meanwhile, none of the ferrule or the split sleeve is provided to the optical adapter 20, and hence it is unnecessary to attach the dust cap even when the optical adapter 20 is transported. The dust cap C is formed in a bottomed cylindrical shape in which, for example, axial one end is opened and another end is closed. When an inner periphery of the opening portion thus formed is fitted and attached to the outer peripheral surface of the sleeve holder 13 provided to the optical connector 10, the opening portion of the sleeve holder 13 is closed. In the optical connector 10, the sleeve holder 13 extends beyond the distal end portion of the ferrule 11, and the ferrule 11 is completely covered with the sleeve holder 13 (refer to FIG. 1). Thus, an inner surface of the dust cap C and the ferrule 11 reliably avoid coming into direct contact with each other. Although the dust cap C is detached when the optical connector 10 is attached to the optical adapter 20, in order to prevent intrusion of foreign matters into the opening portion of the split sleeve 14 after the optical connector 10 is attached into one of the attachment holes 22a on the one side of the optical adapter 20 as illustrated in FIG. 1, the dust cap C may be re-attached to the distal end portion of the sleeve holder 13, the distal end portion being projected into one of the attachment holes 22b on the another side.

The optical connector 10 structured as described above is assembled in the following manner.

Figure 6A:
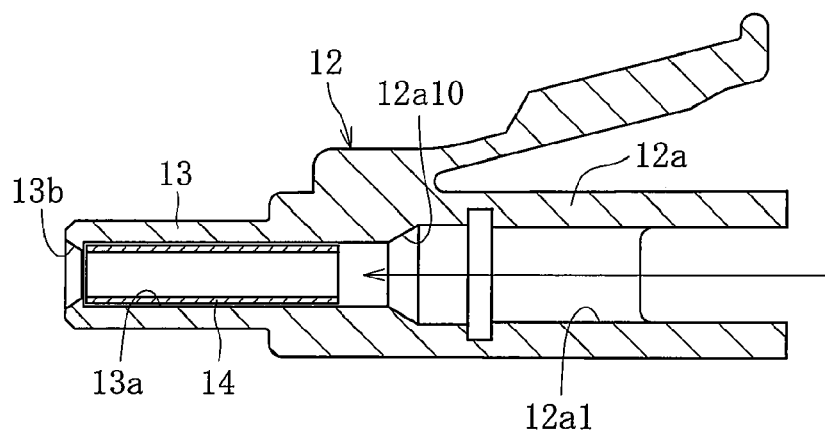
FIG. 6a A sectional view of assembly procedures of the optical connector.
Figure 6B:
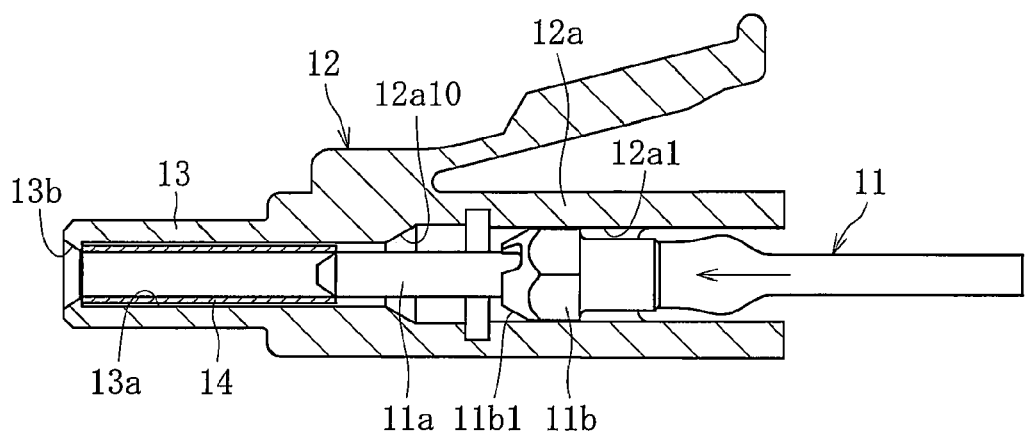
FIG. 6b A sectional view of assembly procedures of the optical connector.

First, as illustrated in FIG. 6a, the split sleeve 14 is inserted from a proximal-end side opening portion of the through-hole 12a1 of the housing 12 so that the split sleeve 14 is arranged along the inner periphery of the sleeve holder 13. After that, the ferrule 11 is inserted from the proximal-end side opening portion of the through-hole 12a1 of the housing 12. Then, the capillary 11a of the ferrule 11 comes into contact with a proximal end portion of the split sleeve 14 whose movement to the distal end side is regulated by the locking portion 13b of the sleeve holder 13 (refer to FIG. 6b). Next, when the ferrule 11 is further pressed-in, a cut-out portion of the split sleeve 14 is radially widened by a tapered surface of the distal end portion of the capillary 11a. Accordingly, the inner diameter of the split sleeve 14 is increased, and the capillary 11a is inserted along the inner periphery of the split sleeve 14. Then, the outer peripheral surface of the capillary 11a is intimately retained by an inner peripheral surface of the split sleeve 14. Next, the tapered surface 11b1 of the flange portion 11b of the ferrule 11 comes into contact with the tapered surface 12a10 formed on the inner periphery of the through-hole 12a1 of the housing 12, and pressing-in of the ferrule 11 is completed.

Then, the stopper 15 is attached from the stopper-attachment hole 12a2 formed in the side surface (refer to FIG. 2) of the main body portion 12a of the housing 12. Specifically, when the stopper 15 is inserted from the stopper-attachment hole 12a2 of the housing 12, the cylindrical portion 11c of the ferrule 11 is pressed-in between the guide surfaces 15b and 15b of the stopper 15 illustrated in FIG. 4, and the stopper 15 is elastically deformed so that the gap between the guide surfaces 15b and 15b thereof are widened. When the stopper 15 is further pressed-in to the inner side of the housing 12, the circular-arc portion 15a of the stopper 15 is fitted to the cylindrical portion 11c of the ferrule 11, and the gap between the guide surfaces 15b and 15b is elastically restored. Note that, a stopper outlet (not shown) is formed, of side surfaces of the housing 12, in a side surface opposite to the side surface provided with the stopper-attachment hole 12a2. When the stopper 15 is pushed out through the stopper outlet, the stopper 15 can be detached from the stopper-attachment hole 12a2.

As described above, in the optical connector 10, the movement of the split sleeve 14 to the distal end side is regulated by the locking portion 13b provided at the distal end portion of the sleeve holder 13, and the ferrule 11 is press-fitted from the proximal end side of the split sleeve 14, and thus the split sleeve 14 can be positioned by the inner periphery of the sleeve holder 13. Further, by appropriate setting of dimensional relations between the ferrule 11, the housing 12, the sleeve holder 13, and the split sleeve 14, the distal end portion of the ferrule 11 (distal end portion of the capillary 11a) can be positioned to substantially a central portion of the split sleeve 14. Further, because the movement of the ferrule 11 to the proximal end side is regulated by the stopper 15, retraction of the ferrule 11 to the proximal end side can be regulated-even when a ferrule of the mating member (not shown) comes into contact therewith.

Figure 7:
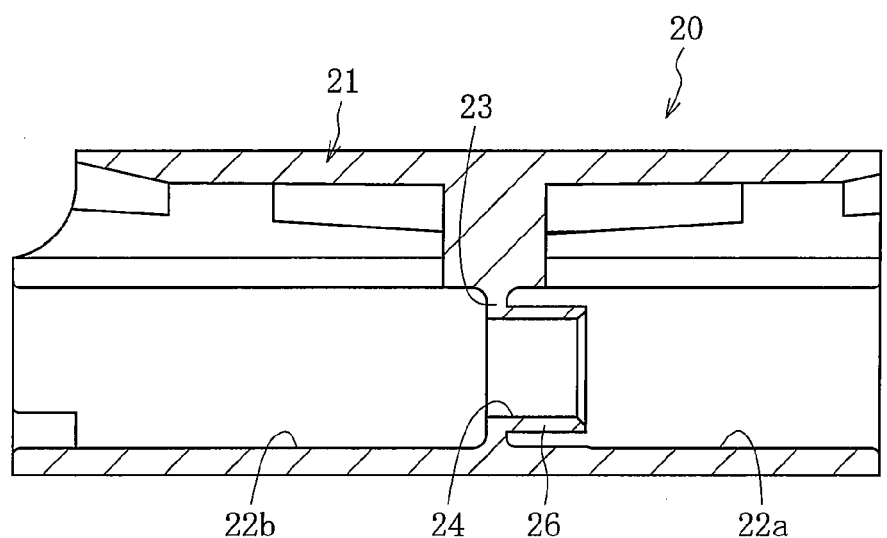
FIG. 7 A sectional view of an optical adapter according to another embodiment of the present invention.

The embodiment of the present invention is not limited to the one described above. For example, illustrated in FIG. 7, when the fitting hole 24 of the optical adapter 20 is extended in the axial direction, it is possible to increase a fitting area with respect to the outer peripheral surface of the sleeve holder 13 of the optical connector 10, to thereby support the optical connector 10 more stably. In this case, as illustrated in FIG. 7, when the fitting hole 24 is provided on an inner peripheral surface of a cylindrical portion 26 extended in the axial direction from the inner wall 23 of the casing 21, a double-pipe structure is constituted partially in the optical adapter 20. However, it is only necessary that the cylindrical portion 26 have a length sufficient for stably supporting the sleeve holder 13. Thus, the cylindrical portion 26 can be made shorter than a sleeve holder having a conventional structure, and hence the risk of defective molding can be reduced. Note that, the area of the fitting hole 24 can be increased not by formation of the cylindrical portion 26 but by an increase of the thickness in the axial direction of the inner wall 23 of the casing 21.

Further, in the optical connector 10 according to the present invention, illustrated in FIG. 1, although retraction of the ferrule 11 to the proximal end side is regulated by the stopper 15, this should not be construed restrictively. For example, retraction of the ferrule 11 may be regulated by a cap and a spring as in the optical connector 110 illustrated in FIG. 8.

REFERENCE SIGNS LIST 1 optical-fiber connection unit
10 optical connector
110 normal optical connector
11 ferrule
12 housing
13 sleeve holder
13b locking portion
14 split sleeve
15 stopper
20 optical adapter
21 casing
22a, 22b attachment hole
23 inner wall
24 fitting hole

The invention claimed is:

1. An optical-fiber connection unit, comprising:
an optical connector comprising:
    a ferrule having an inner periphery inside which an optical fiber is allowed to pass;
    a housing for retaining the ferrule inside an inner periphery thereof;
    a split sleeve having an inner periphery along which a distal end portion of the ferrule is inserted; and
    a sleeve holder provided at a distal end portion of the housing and having an inner periphery inside which the split sleeve is retained; and
an optical adapter comprising:
    a casing provided with a pair of attachment holes; and
    a fitting hole provided inside the casing so that the pair of attachment holes are communicated with each other and that an outer peripheral surface of the sleeve holder provided to the optical connector is fitted to an inner peripheral surface of the fitting hole.

2. An optical-fiber connection unit according to claim 1, further comprising a locking portion provided at a distal end portion of the sleeve holder and projected radially inward, wherein the locking portion and a distal end portion of the split sleeve are engaged with each other in an axial direction.

3. An optical-fiber connection unit according to claim 1, wherein the casing of the optical adapter is integrally molded.

4. An optical-fiber connection unit according to claim 1, wherein the optical connector is used as a behind-the-wall (BTW) optical connector.

5. An optical adapter, comprising:
a casing provided with a pair of attachment holes; and
a fitting hole for communicating the pair of attachment holes with each other so that an outer peripheral surface of a sleeve holder of an optical connector is fitted to an inner peripheral surface of the fitting hole, wherein the optical connector comprises:
- a ferrule having an inner periphery inside which an optical fiber is allowed to pass;
- a housing for retaining the ferrule inside an inner periphery thereof;
- a split sleeve having an inner periphery along which a distal end portion of the ferrule is inserted; and
- the sleeve holder provided at a distal end portion of the housing and having an inner periphery inside which the split sleeve is retained.

* * * * *